(12) United States Patent
Fontaine (10) Patent No.: US 8,006,796 B1
(45) Date of Patent: Aug. 30, 2011

(54) PERSONAL VEHICLE (76) Inventor: Roger F. Fontaine, Splendora, TX (US)

( * ) Notice: Subject to any disclaimer, the term of this patent is extended or adjusted under 35 U.S.C. 154(b) by 438 days.

(21) Appl. No.: 12/247,907

(22) Filed: Oct. 8, 2008

Related U.S. Application Data (60) Provisional application No. 60/980,828, filed on Oct. 18, 2007.

(51) Int. Cl.
B60K 17/356 (2006.01)

(52) U.S. Cl. ....... 180/235; 180/6.64; 180/242; 180/418; 280/400; 280/442

(58) Field of Classification Search ................. 180/6.54, 180/242, 6.64, 418, 235, 400, 442, 492, 93.508
See application file for complete search history.

(56) References Cited

U.S. PATENT DOCUMENTS

| | | | | |
|---|---|---|---|---|
| 3,286,781 A * | 11/1966 | Ramaker | | 180/265 |
| 3,414,072 A * | 12/1968 | Hodges, Jr. et al. | | 180/24 |
| 3,568,778 A * | 3/1971 | Swisher et al. | | 172/785 |
| 3,611,838 A * | 10/1971 | Utter | | 477/31 |
| 3,865,208 A * | 2/1975 | Crawshay et al. | | 180/6.48 |
| 4,142,641 A * | 3/1979 | Dake | | 414/541 |
| 4,573,319 A * | 3/1986 | Chichester | | 60/422 |
| 4,669,566 A * | 6/1987 | Bergius et al. | | 180/420 |
| 5,117,936 A * | 6/1992 | Nakamura et al. | | 180/242 |
| 5,180,028 A * | 1/1993 | Perrenoud, Jr. | | 180/235 |
| 5,540,539 A * | 7/1996 | Wolfman et al. | | 414/541 |
| 6,045,067 A * | 4/2000 | Foster | | 239/754 |
| 6,170,242 B1 * | 1/2001 | Gordon | | 56/15.8 |
| 7,096,989 B2 * | 8/2006 | Ohashi et al. | | 180/242 |
| 7,770,681 B2 * | 8/2010 | Marathe et al. | | 180/197 |
| 2005/0139412 A1 * | 6/2005 | Vigholm | | 180/418 |
| 2005/0178599 A1 * | 8/2005 | Sakikawa | | 180/235 |
| 2006/0261569 A1 * | 11/2006 | Delhotal | | 280/87.021 |

* cited by examiner

Primary Examiner — Kevin Hurley
Assistant Examiner — Maurice Williams
(74) Attorney, Agent, or Firm — Egbert Law Offices PLLC (57) ABSTRACT A personal vehicle has a fore section and an aft section. The fore and aft sections each have a frame, a transaxle mounted to the frame, and a wheels attached to the transaxle. The wheels of the aft section are vertically articulated relative to the frame of the aft section. A seat is disposed on the frame of the fore section. A joystick and interface are mounted to the fore section. A motor is mounted to the frame of the aft section. A hydraulic system is operatively connected to the motor. A shaft is operatively connected to the motor. A fender assembly is mounted to the fore and aft sections. A rollover structure is mounted to the fore and aft sections. The hydraulic systems controls the directional movement of the personal vehicle and includes a hydraulic pump, rotovalves, a null valve, a drive cylinder, and a steering cylinder.

18 Claims, 5 Drawing Sheets

PERSONAL VEHICLE

CROSS-REFERENCE TO RELATED U.S. APPLICATIONS

The present application claims priority from U.S. Provisional Patent Application Ser. No. 60/980,828, filed on Oct. 18, 2007, entitled "Personal Vehicle."

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to all-terrain vehicles (ATVs). More particularly, the present invention the relates to ATVs specially equipped for disabled persons.

2. Description of Related Art Including Information Disclosed Under 37 CFR 1.97 and 37 CFR 1.98

All-terrain vehicles (ATVs) are commonly used for recreation, such as in motor sports and hunting. ATVs are also used to transport small amounts of equipment and to traverse cumbersome terrain. ATVs are commonly powered by engines and have independent suspensions. ATVs are manufactured with two wheels, three wheels, and four wheels. A seat is usually mounted to the top of the ATV so that a person can drive the ATV. Driving an ATV usually requires the use of all limbs, including both arms and both legs. A driver of an ATV usually uses his or arms and legs so as to change the location of the body on the ATV so as to control the center of gravity of the ATV. A problem has arisen for potential drivers who are physically disabled in one way or another and cannot drive current ATVs due to their physical disability.

Many people throughout the world have physical disabilities that require them to use wheelchairs as a primary means of mobility. Although many types of wheelchairs exist, none have been found that allow a disabled person to traverse cumbersome terrain in the manner that an ATV allows a non-disabled person to do so. Thus, there is a need for a personal vehicle that allows a disabled person to traverse cumbersome terrain while meeting the needs and being specially configured so as to accommodate a disabled person.

Various patents have issued relating to personal vehicles. For example, U.S. Patent Publication No. 2007/0152427, published Jul. 5, 2007 to Olsen, discloses articulated wheel assemblies and an associated vehicle that has at least one offset connecting arm rotatably attached at one end to a payload platform. The arm is attached at the other end to a linear actuator. The payload platform can be a seat. The linear actuator is further connected to a wheel. A rotary actuator varies the linear actuator swing angle. The rotary actuator eccentrically rotates a hubless wheel. A linear actuator motor varies the length of the linear actuator. The assembly and vehicle also have a propulsion motor.

U.S. Pat. No. 6,805,209, issued on Oct. 19, 2004 to Hedeen, discloses a wheelchair motorizing apparatus that employs an articulated tread drive in combination with front support wheels and rear drive wheels. The tread drive is used to provide traction during the ascent or descent of stairs or the traversing of obstacles. The front support wheels are used to raise and lower the front of the wheelchair. The rear drive wheels are used to raise and lower the rear of the wheelchair in addition to providing drive traction and steering. A positioning mechanism integral with the tread drive acts to keep the treads in contact with the terrain or stairs.

U.S. Pat. No. 7,398,842, issued on Jul. 15, 2008 to Fontecchio et al., discloses a self-propelled wheelchair with independently driven wheels and dual support frames connected in an articulating relationship. A front frame supports a seat and a rearward extended pivot connector. A pair of front wheels and left and right front drive units are connected to the front frame. A rear frame includes a forwardly extended pivot joint. A rear support platform has a power source thereon. A pair of rear wheels and left and right rear drive units connect thereto. An articulating junction is formed by the front frame pivot connector attached to the rear frame pivot joint and provides articulation between the front frame and rear frame. A manually operable control unit includes computer circuitry in connection with each wheel drive unit. The manipulation of the control unit actuates each drive unit for control of rotational speed and direction of rotation for each wheel.

U.S. Pat. No. 7,096,989, issued on Aug. 29, 2006 to Ohashi et al., discloses an articulated vehicle with a working device that has a first frame having a prime mover mounted thereon and supporting a first transaxle apparatus. The first transaxle apparatus includes an input shaft receiving power from the prime mover, a pair of first axles, and a hydrostatic transmission. The hydrostatic transmission comprises a variable hydraulic pump, a first hydraulic motor fluidly connected to the hydraulic pump via a fluid passage, and a housing with a port fluidly connected to the fluid passage. The second transaxle apparatus includes a pair of second axles having different lengths and a second hydraulic motor. The second hydraulic motor is fluidly connected to the port. Proximal ends of the first and second frames with respect to the vehicle are coupled to each other so that the first and second frames are rotatable around a vertical axis relative to each other when steered.

U.S. Pat. No. 6,889,784, issued on May 10, 2005 to Troll, discloses a vehicle incorporating a power unit having a front portion, a rear portion and a power source. A drive wheel is disposed in the front of the power unit and connected to the power source. A brake pad is connected to the power unit beneath the power source and a handle bar extends back from the power unit. The vehicle includes a trailer unit that is disposed behind the power unit. The trailer unit has a two trailer wheels disposed on opposite sides of the trailer unit. A connecting joint connects the power unit to the trailer unit and allows the power unit and trailer unit to move with respect to one another about the horizontal pitch axis and/or vertical yaw axis.

International Publication No. WO2005/007453, published on Jan. 27, 2005 to Gorman, discloses an all terrain vehicle adapted preferably for use in fire-fighting and emergency rescue in remote areas or other areas normally inaccessible by conventional fire and rescue vehicles. The vehicle has front and rear units connected by an articulating joint to improve vehicle mobility and agility. The vehicle further preferably has at least one pump, at least one hose and nozzle, at least one storage reel for the hose or hoses, at least one fluid, and at least one foam and foam mixer.

International Publication No. WO99/08642, published on Feb. 25, 1995 to Prince, discloses a vehicle that is adapted to carry a wheelchair. The vehicle has a chassis on ground-engaging wheels. A floor pan is adapted to receive and unload a wheelchair.

U.S. Pat. No. 4,714,140, issued on Dec. 22, 1987 to Hatten, discloses a remote-controlled multi-axis all-terrain vehicle that has front and rear-lugged driving wheels. The front and rear wheels are steerable about a vertical axis and pivotable about a longitudinal axis of the vehicle. The vehicle is remotely controlled and includes a hydrostatic drive for the wheels of the vehicle. A level control system includes level sensing instruments and controls for automatically leveling the frame of the vehicle for up to 35° slopes.

U.S. Pat. No. 4,081,046, issued on Mar. 28, 1978 to Stone, discloses an articulated vehicle having forward and rearward frame sections connected together for relative movement about a vertical axis during steering and for oscillation or twisting about a horizontal axis during movement on uneven terrain in which the drive train is supported in such a manner that the angles of displacement of universal connections between drive shafts are maintained at equal angles for all angles of articulation and oscillation.

U.S. Patent Publication No. 2001/0033067, published on Oct. 25, 2001 to Vangsgard, discloses an articulating vehicle that includes a front axle operatively connected to a front frame and a rear axle is operatively connected to the rear frame. A torsional joint has an inner shaft member operatively connected one of the frames and an outer hollow member operatively connected to the other of the frames. An elastic material is positioned between the inner member and outer member. The elastic material connects the inner and outer members so that the frames may rotate relative to each other along the longitudinal axis as the elastomeric member is compressed and resiliently resists rotation between the frames.

It is an object of the present invention to provide an ATV for disabled persons.

It is another object of the present invention to provide an ATV that can be used for work or recreation.

It is another object of the present invention to provide an ATV that has a vertically articulated axle for traversing cumbersome terrain.

It is still another object of the present invention to provide an ATV that has front and rear frames that pivot with respect to one another.

It is another object of the present invention to provide an ATV that can be controlled by a disabled person.

It is another object of the present invention to provide an ATV that automatically stops in the event that the disabled person loses control.

It is another object of the present invention to provide an ATV that can be driven by both disabled and non-disabled persons.

These and other objects and advantages of the present invention will become apparent from a reading of the attached specification and appended claims.

BRIEF SUMMARY OF THE INVENTION

The present invention is a personal vehicle. The personal vehicle has a fore section comprising a frame, a transaxle mounted to the frame of the fore section, and a pair of wheels attached to the transaxle of the fore section. The personal vehicle has an aft section comprising a frame horizontally articulated relative to the frame of the fore section, a transaxle vertically articulated relative to the frame of the aft section, and a pair of wheels attached to the transaxle of the aft section. Each of the pair of wheels of the aft section are vertically articulated relative to the frame of the aft section. The personal vehicle has a seat disposed on the frame of the fore section, a means for interfacing a user to directional mobility controls, a motor mounted to the frame of the aft section, a hydraulic system operatively connected to the motor, a shaft operatively connected to the motor, a fender assembly mounted to the fore and aft sections, and a rollover structure mounted to the fore and aft sections.

The seat has a height the same as a height of a wheel chair. The seat has an armrest. The means is mounted to the fore section. The shaft is positioned in an articulating point between the frame of the aft section and the frame of the fore section. The motor rotates the shaft. The hydraulic system has a hydraulic pump operatively connected to the motor, a hydraulic fluid tank supplying a hydraulic fluid to the hydraulic pump, a first rotovalve operatively connected to the hydraulic pump and to the means, a drive cylinder operatively connected to the first rotovalve, a second rotovalve operatively connected to the hydraulic pump and to the means, and a steering cylinder operatively connected to the second rotovalve. The drive cylinder has a lever activating a movement of the transaxles of the fore and aft sections. The steering cylinder operatively connected to the pair of wheels of the fore section. A null valve is operatively connected to the lever of the drive cylinder. The null valve actuates the cylinder of the lever so as to bring the transaxles of the fore and aft sections to a stop.

The means has a joystick positioned on the armrest of the seat in the fore section, and an interface cooperative with the joystick. The joystick is operatively connected to the first and second rotovalves of the hydraulic system so as to control a forward, reverse, right, and left movement. The interface is suitable for transmitting a control signal from the joystick to the interface. The joystick has a neutral position. The neutral position of the joystick activates the null valve so as to actuate the lever of the drive cylinder so as to bring the transaxles of the fore and aft sections to a stop. The interface can be hydraulically controlled or electrically controlled. The interface has a touch-sensitive panel.

The joystick is operatively connected to the first rotovalve by a first electromechanical box. The first electromechanical box converts an electronic signal from the joystick to a mechanical signal. The first electromechanical box has an arm actuating the first rotovalve. The joystick is operatively connected to the second rotovalve by a second electromechanical box. The second electromechanical box converts an electronic signal from the joystick to a mechanical signal. The second electromechanical box has an arm actuating the second rotovalve.

The first rotovalve is connected to the hydraulic fluid tank. The second rotovalve is connected to the hydraulic fluid tank. The null valve is connected to the hydraulic fluid tank. The shaft drives the transaxles of the fore and aft sections. The transaxle of the fore section rotating the pair of wheels of the fore section. The transaxle of the aft section rotating the pair of wheels of the aft section. The first rotovalve actuates the drive cylinder so as to control the forward and backward movement. The second rotovalve actuates the steering cylinder so as to control the left and right movement. The steering cylinder comprises a first cylinder having a first fluid connection and a second fluid connection, and a second cylinder having a first fluid connection and a second fluid connection. The first fluid connection of the first cylinder is connected to the second rotovalve. The first fluid connection of the second cylinder is connected to the second rotovalve and to the second fluid connection of the first cylinder. The second fluid connection of the second cylinder is connected to the first fluid connection of the first cylinder and to the second fluid connection of the first cylinder through an adjustable orifice.

The hydraulic pump pressurizes the hydraulic fluid. The hydraulic pump provides the hydraulic fluid to the first and second rotovalves. The hydraulic pump provides the hydraulic fluid to the null valve. The hydraulic system further comprises an auxiliary connection operatively connected to the hydraulic fluid pump. The hydraulic fluid pump provides the hydraulic fluid to the auxiliary connection.

Each of the pair of wheels of the fore section has an independent suspension. Each of the pair of wheels of the aft section has an independent suspension. The shaft is operatively connected to the transaxle of the fore section by a belt. The shaft rotates the belt so as to create a movement of the pair of wheels of the fore section with the transaxle of the fore section. The shaft is operatively connected to the transaxle of the aft section by another belt. The shaft rotates the other belt so as to create a movement of the pair of wheels of the aft section with the transaxle of the aft section.

The fender assembly comprises a first pair of fenders mounted on the frame of the fore section, the first pair of fenders being of a fiberglass, aluminum, or steel material, and a second pair of fenders mounted on the frame of the aft section, the second pair of fenders being of a fiberglass, aluminum, or steel material.

The rollover structure comprises a first section mounted to the frame of the fore section, and a second section mounted to the frame of the aft section. The first section has a rectangular portion and an hour-glass portion. The rectangular portion is positioned above the seat. The hour-glass portion is positioned behind the seat. the first section has a female connection. The second section having a triangular portion and a rectangular portion. The triangular portion is positioned above the motor. The rectangular portion of the second section is positioned behind the motor. The triangular portion has a point. The point has a male connection. The male connection is connected to the female connection so that the first section horizontally articulates relative to the second section along a longitudinal axis of the articulating point.

The motor can be a gasoline engine. The gasoline engine has a generator that supplies electricity to the means and to the hydraulic system.

DETAILED DESCRIPTION OF THE INVENTION

Figure 1:
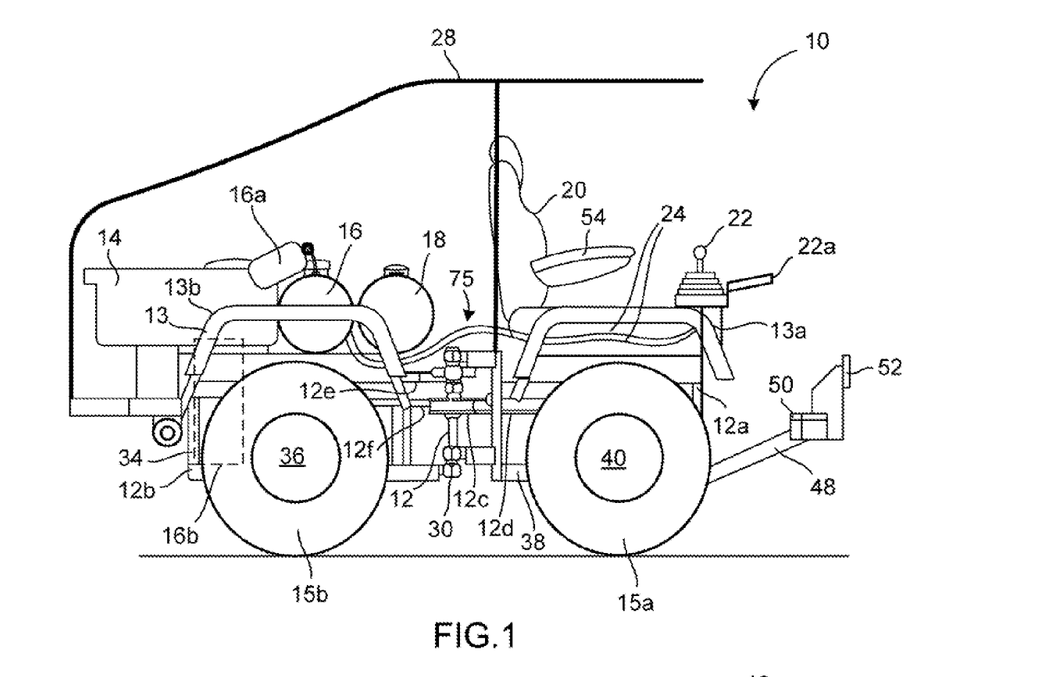
FIG. 1 shows a side elevational view of the preferred embodiment of the personal vehicle of the present invention.

Referring to FIG. 1, there is shown a side elevational view of the preferred embodiment of the personal vehicle 10 of the present invention. The personal vehicle 10 has a fore section 12a and an aft section 12b. The fore section 12a and aft section 12b are horizontally articulated at articulating point 30. The fore section 12a has a frame 38, a transaxle 40 mounted to the frame, and a pair of wheels 15a mounted to the transaxle 40. The aft section 12b has a frame 34 horizontally articulated relative to the frame 38 of the fore section 12a, a transaxle 36 vertically articulated relative to the frame 34, and a pair of wheels 15b attached to the transaxle 36. Each of the pair of wheels 15b is vertically articulated relative to the frame 34 of the aft section 12b. The transaxle 40 of the fore section 12a and the transaxle 36 of the aft section 12b allow the personal vehicle 10 to increase in speed or decrease in speed without the up-shifting or down-shifting of a traditional transmission. Keeping the ride as smooth as possible is especially important for disabled persons riding in the seat 20 of the personal vehicle 10.

A seat 20 is disposed in the frame 38 fore section 12a. The seat 20 has a height that is the same height as a wheelchair. The seat 20 has armrests 54 on either side of the seat 20. The armrests 54 are rotatably retractable so as to allow a disabled person to easily transfer from a wheelchair to the seat 20. The armrests 54 pivot downwardly so that the user in seat 20 can rest his or her arms thereon.

A means for interfacing a user to directional mobility controls is mounted to the frame 38 of the fore section 12a. The means includes a joystick 22 and an interface 22a. The joystick 22 is positioned on the armrest 54 of the seat 20 in the fore section 12a. The interface 22a is cooperative with the joystick 22 and is suitable for transmitting a control signal from the joystick 22 to the interface 22a. The interface 22a can be a touch-sensitive panel. The touch-sensitive panel has a main switch that turns the personal vehicle 10 on and off, a choke control, and a throttle control. The joystick 22 is easily controlled by a disabled person sitting in seat 20. The interface 22a is cooperative with the joystick 22 so that the interface 22a is easily reachable by a user sitting in seat 20. The interface 22a can be electrically controlled or hydraulically controlled. The user in seat 20 controls the personal vehicle 10 by moving the joystick 22 forward, backward, or side-to-side. The personal vehicle 10 gives a disabled person a great feeling of freedom and usefulness in that they can go places and do things that they are not usually able to do. The personal vehicle 10 is designed so that the person sits in the front of the personal vehicle 10 similar to a traditional wheelchair. The means 22 and 22a are similar to the controls of a traditional, powered wheelchair. Moreover, the arrangement of the seat 20 and the height of the seat 20 are similar to a traditional wheelchair. The personal vehicle 10 can be built in different sizes and power ratings. The personal vehicle 10 can be used as a towing vehicle, a lawnmower, or a lawn, and garden tractor. The personal vehicle 10 can be four-wheel drive, and front or rear two-wheel drive.

A motor 14 is mounted to the frame 34 of the aft section 12b. The motor 14 can be a gasoline engine, a battery-powered electric motor, or a hybrid combination thereof. If the motor 14 is electrically powered, the batteries are mounted near the transaxle 40 on frame 38 of the fore section 12a. Gasoline is stored in tank 18 if the motor 14 is a gasoline engine. The gasoline engine have a generator that supplies electricity to the means, i.e. the joystick 22 and interface 22a. A hydraulic system 75 is operatively connected to the motor 14. A shaft 12 is operatively connected to the motor 14. The shaft 12 is positioned in the articulating point 30 between the frame 34 of the aft section 12b and the frame 38 of the fore section 12a. The motor 14 rotates a shaft 12. The motor 14 is operatively connected to the shaft 12 by drive belt 12e. The shaft 12 has a pulley 12c that connects the shaft 12 to the transaxle 36 by drive belt 12f and to transaxle 40 by drive belt 12d. The shaft 12 rotates the belt 12f so as to create a movement of the pair of wheels 15b with the transaxle 36 of the aft section 12b. The shaft 12 rotates the belt 12d so as to create a movement of the pair of wheels 15a with the transaxle 40 of the fore section 12a. The gasoline engine have a generator that supplies electricity to the hydraulic system 75.

A fender assembly 13 is mounted to the fore section 12a and the aft section 12b. The fender assembly 13 has a first pair of fenders 13a mounted on the frame 38 of the fore section 12a and a second pair of fenders 13b mounted on the frame 34 of the aft section 12b. The fenders 13a and 13b can be made of a fiberglass, aluminum or steel material. The fender assembly 13 protects the rider from the rotation of the wheels 15a and 15b and also prevent splashes of water and mud on the driver of the personal vehicle 10. A lower structure 48 is attached to the frame 38 of the fore section 12a. The lower structure 48 has a plate 50 and a bumper 52. The rider in the seat 20 places his or her feet on the plate. The bumper 52 adds extra protection in the case that the personal vehicle 10 hits an object.

A rollover structure 28 is mounted to the fore section 12a and aft section 12b. The rollover structure 38 has a first section mounted to the frame 38 of the fore section 12a and a second section mounted to the frame 34 of the aft section 12b. The roll over structure 28 protects a user sitting in seat 20 from injury if the personal vehicle 10 were to tip or roll over.

Figure 2:
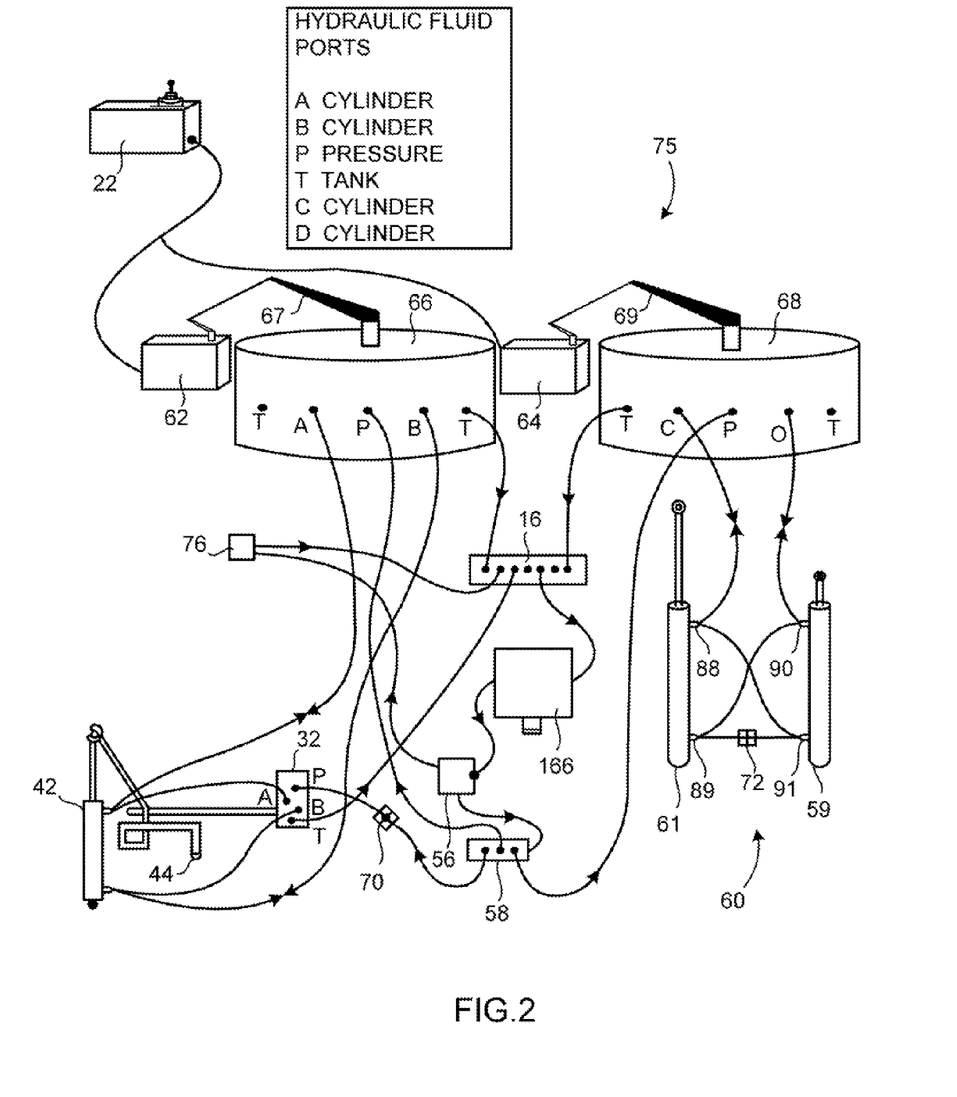
FIG. 2 shows a schematic diagram of the hydraulic system of the personal vehicle of the present invention.

Referring to FIG. 2, there is shown a schematic diagram of the hydraulic system 75 of the personal vehicle 10 of the present invention. The hydraulic system 75 has a hydraulic pump 16b that is connected to the motor 14. A hydraulic fluid tank 16 supplies hydraulic fluid to the hydraulic pump 16b. The hydraulic pump 16b pumps pressurized hydraulic fluid through the system 75. The system 75 has an auxiliary connection 76 operatively connected to the hydraulic pump 16b. The hydraulic pump 16b provides hydraulic fluid to the auxiliary connection 76. Power tools or other equipment can be connected to the auxiliary connection 76 so that the equipment can be powered by the hydraulic system 75 of the personal vehicle 10.

A first rotovalve 66 is operatively connected to the hydraulic pump 16b and to the means. In the preferred embodiment, the first rotovalve 66 is connected to the joystick 22 of the means. The joystick 22 is operatively connected to the first rotovalve 66 by a first electromechanical box 62. The first electromechanical box 62 converts an electronic signal from the joystick 22 to a mechanical signal. The first electromechanical box 62 has an arm 67 that actuates the first rotovalve 66. A second rotovalve 68 is operatively connected to the hydraulic pump 16b and to the means. In the preferred embodiment, the second rotovalve 68 is connected to the joystick 22 of the means. The joystick 22 is operatively connected to the second rotovalve 68 by a second electromechanical box 64. The second electromechanical box 64 coverts an electronic signal from the joystick 22 to a mechanical signal. The second electromechanical box 64 has an arm 69 that actuates the second rotovalve 68.

The joystick 22 of the means is operative connected to the first and second rotovalves 66 and 68 of the hydraulic system 75 so as to control a forward, backward, right, and left movement of the personal vehicle 10. Rotovalves 66 and 68 select a flow of the hydraulic fluid in the hydraulic system 75. The hydraulic pump 16 provides hydraulic fluid to the first and second rotovalves 66 and 68. First rotovalve 66 can cause hydraulic fluid to flow to a drive cylinder 42. The drive cylinder 42 is operatively connected to the first rotovalve 66. The drive cylinder 42 has a lever 44 that activates a movement of the transaxles 36 and 40 of the aft and fore sections 12b and 12a, respectively. The first rotovalve 66 actuates the drive cylinder 42 so as to control a forward and backward movement of the personal vehicle 10. The first rotovalve 66 is also connected to hydraulic fluid tank 16.

The second rotovalve 68 can cause hydraulic fluid to flow to a steering cylinder 60. The steering cylinder 60 is operatively connected to the frame 38 of the fore section 12a and the frame 34 of the aft section 12b. The second rotovalve 68 is also connected to the hydraulic fluid tank 16. The steering cylinder 60 has a first cylinder 61 and a second cylinder 59. The first cylinder 61 has a first fluid connection 88 and a second fluid connection 89. The second fluid cylinder 59 has a first fluid connection 90 and a second fluid connection 91. The first fluid connection 88 of the first cylinder 61 is connected to the second rotovalve 68. The first fluid connection 90 of the second cylinder 59 is connected to the second rotovalve 68 and to the second fluid connection 89 of the first cylinder 61. The second fluid connection 91 of the second cylinder 59 is connected to the first fluid connection 88 of the first cylinder 61 and, through an adjustable restrictor valve 75, to the second fluid connection 89 of the first cylinder 61. The second rotovalve 68 actuates the steering cylinder 60 so as to control the left and right movements of the personal vehicle 10.

Referring still to FIG. 2, a null valve 32 is included in the hydraulic system 75. The null valve 32 is operatively connected to the lever 44 of the drive cylinder 42. The null valve 32 activates the drive cylinder 42 so as to bring the transaxles 40 and 36 of the fore and aft sections 12a and 12b, respectively, to a stop. The hydraulic pump 16b provides hydraulic fluid to the null valve 32.

The joystick 22 of the means has a neutral position. When in the neutral position, the null valve 32 activates the cylinder 42 so as to actuate the lever 44 of the drive cylinder 42 so as to bring the transaxles 40 and 36 of the fore and aft sections 12a and 12b, respectively, to a stop. More particularly, the joystick 22, in the neutral position, which activates the first rotovalve 66 by arm 67, allows the null valve 32 to bring the personal vehicle to a crawl or complete stop should a user leave the joystick 22 in the neutral position. That is, when the joystick 22 is in a neutral position, the null valve 32 causes the vehicle to come to a complete stop or crawl.

The joystick 22 and interface 22a of the means meters the hydraulic fluid to the steering cylinder 60 for left and right directions. The null valve 32 controls the forward and backward direction of the personal vehicle 10 through drive cylinder 42 that is mechanically connected to the lever 44 of the transaxles 40 and 36. Tilting the joystick 22 either left or right while in either the forward or backward direction allows the vehicle 10 to turn proportionately in the desired direction. As the joystick 22 is moved in a forward or in a backward direction, the vehicle 10 speed also increases or decreases with the movement of joystick 22. While moving the joystick forward, a corresponding amplified movement of the cylinder 42 changes the speed of the vehicle as the joystick 22 sends a mechanical signal to the null valve 32 via the rotovalve 66. When the joystick 22 returns to a neutral position, the null valve 32 returns the drive cylinder 42 to the neutral position. A control cable interconnects the lever 44 to the transaxles 36 and 40 so that they receive the same signals.

Figure 3:
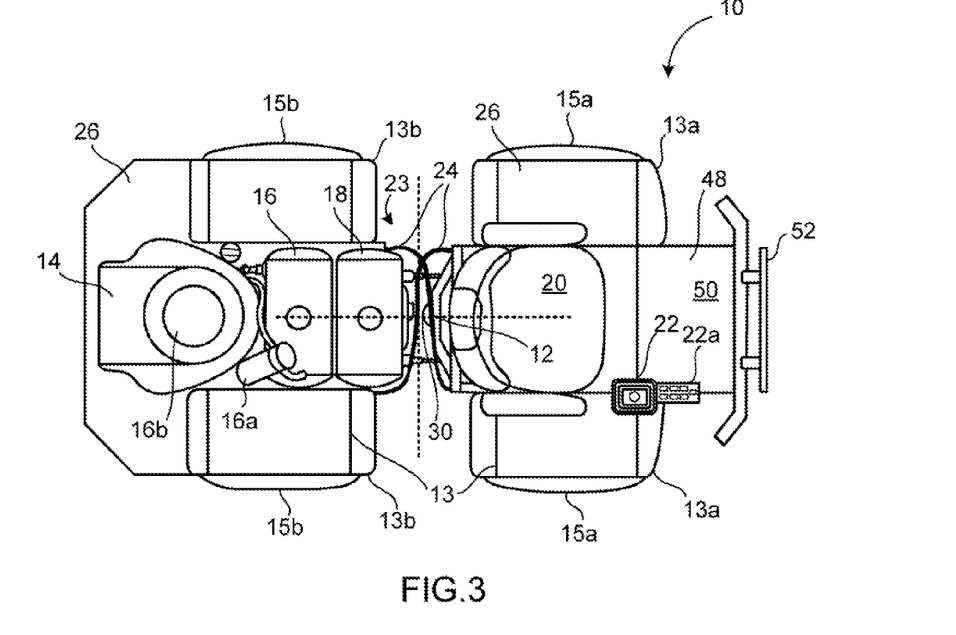
FIG. 3 shows a top view of the personal vehicle of the present invention.

Referring to FIG. 3, there is shown a top view of the personal vehicle 10 of the present invention. The fore section 12a and aft section 12b can be seen as connected at articulating point 30. The gasoline tank 18 can be seen as positioned closer to the seat 20 than the hydraulic fluid tank 16. The wheels 15a and 15b can be seen as extending outwardly from the frames 38 and 34 further than the fenders 13a and 13b, respectively. The joystick 22 and interface 22a can be mounted to the right of the seat 20 or to the left of the seat 20. It can be seen that the joystick 22 and interface 22a are easily reachable by a disabled person sitting in seat 20.

Figure 4:
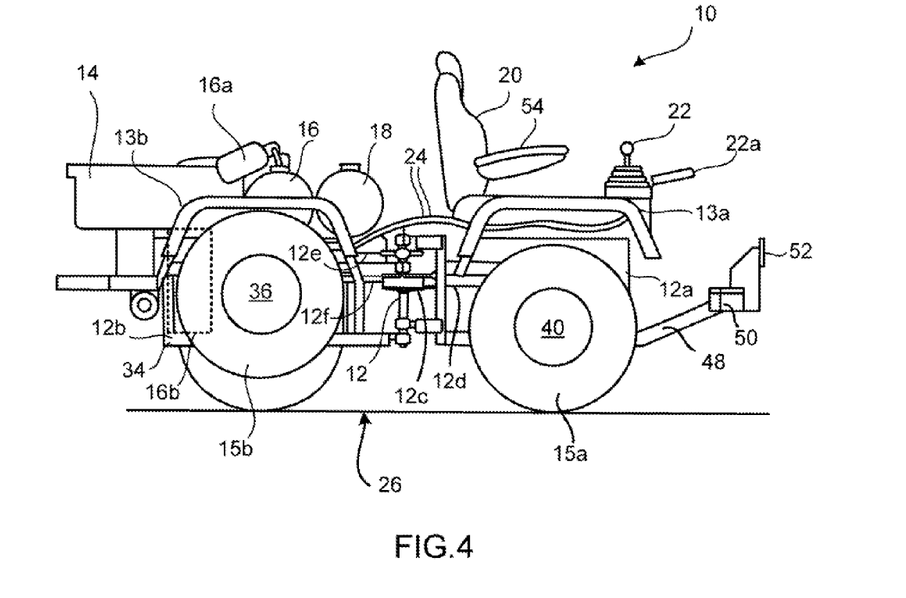
FIG. 4 shows a side elevational view of the personal vehicle of the present invention, with the rear transaxle being vertically articulated.

Referring to FIG. 4, there is shown a side elevational view of the personal vehicle 10 of the present invention, with the transaxle 36 being vertically articulated relative to the frame 34 of the aft section 12b. Because the personal vehicle 10 can be used for all-terrain driving, it is important that the personal vehicle 10 be able to traverse cumbersome terrain, such as rocks and/or small boulders. The vertically-articulating transaxle 36 of the personal vehicle 10 allows wheels 15b to articulate relative to the frame 34 so as to provide for a smoother ride on the personal vehicle 10. Importantly, the transaxle 36 maintains traction with all four wheels. The vertically-articulating transaxle 36 also preserves the center of gravity of the aft section 12b and reduces the chance of tipping while traversing cumbersome terrain. The shaft 12 drives the transaxle 40 of the fore section 12a and the transaxle 36 of the aft section 12b. The transaxle 40 of the fore section 12a rotates the pair of wheels 15a of the fore section 12a. The transaxle 36 of the aft section 12b rotates the pair of wheels 15b of the aft section 12b. Each of the wheels 15a of the fore section 12a have an independent suspension. Each of the wheels 15b of the aft section 12b have an independent suspension. Each of the wheels 15a and 15b can have a motor, hydraulics, or electronics.

Figure 5:
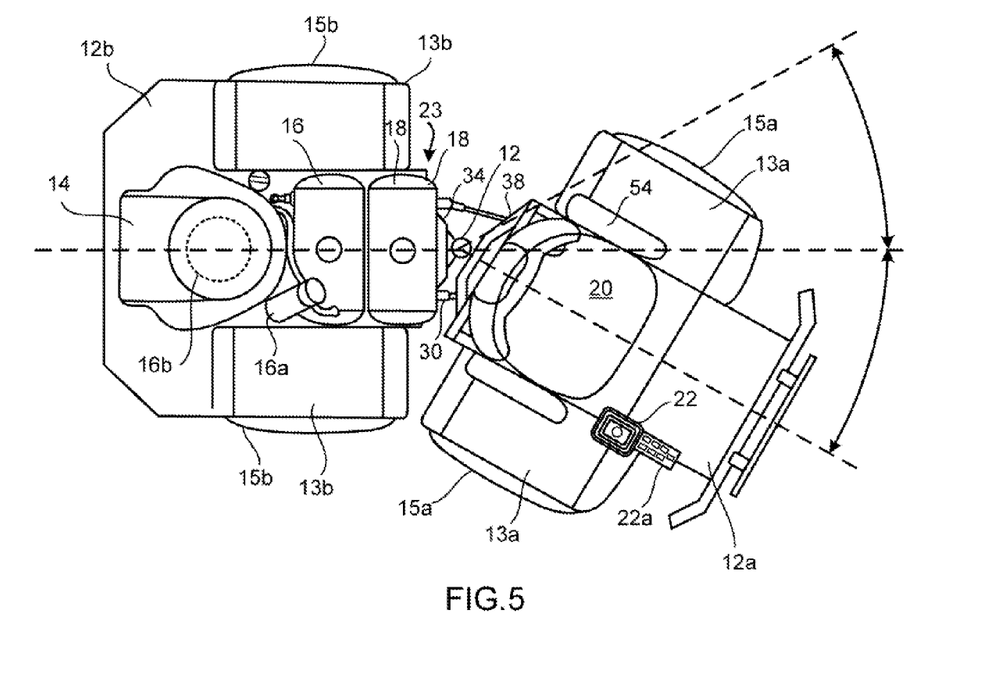
FIG. 5 shows a top view of the personal vehicle of the present invention, with the fore section horizontally articulated relative to the aft section.

Referring to FIG. 5, there is shown a top view of the personal vehicle 10 of the present invention, with the fore section 12a horizontally articulated relative to the aft section. The frame 38 of the fore section 12a is horizontally articulated relative to the frame 34 of aft section 12b at articulating point 30. The articulating point 30 allows the personal vehicle 10 to easily steer in a curved direction. The personal vehicle 10 is thus able to easily maneuver around and across cumbersome terrain because of the improved steerability due to the articulating point 30 between the fore section 12a and the aft section 12b.

Figure 6:
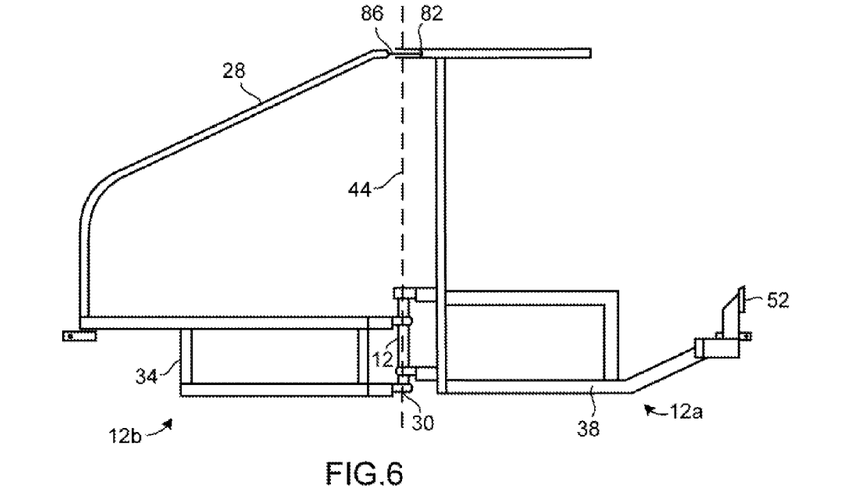
FIG. 6 shows a side elevational view of the rollover structure and frame of the personal vehicle of the present invention.

Referring to FIG. 6, there is shown a side elevational view of the frames 34 and 38 and rollover structure 28 of the personal vehicle 10. The roll over structure 28 is connected to the rear of the frame 34 of the aft section 12b. The rollover structure 28 extends upwardly the frame 34 and then angles upwardly to the longitudinal axis 74 of the articulating point 30. The rollover structure 28 extends upwardly from the frame 38 of the fore section 12a. The rollover structure extends over the seat 20 of the personal vehicle 10. The rollover structure 28 has an articulating point at the longitudinal axis 74.

Figure 7:
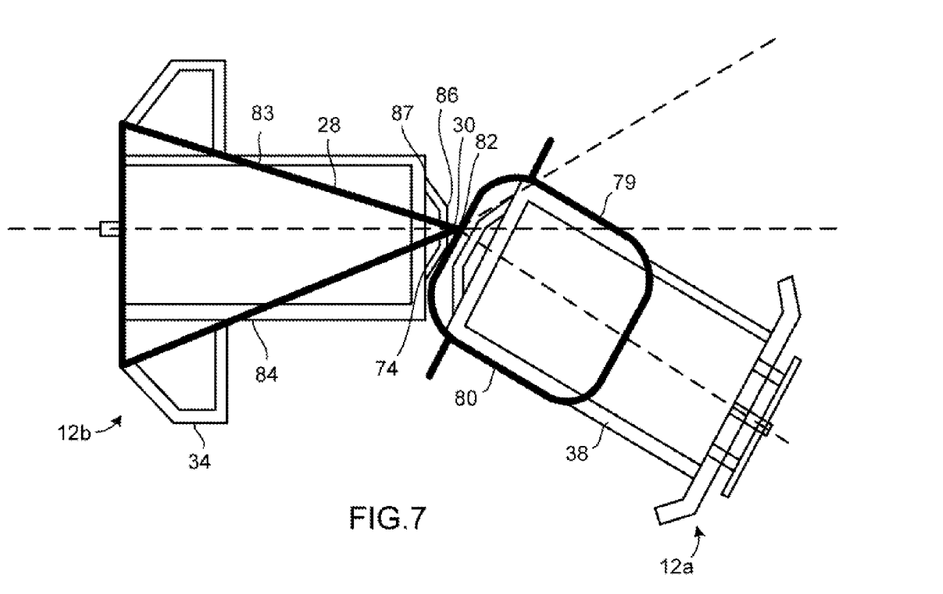
FIG. 7 shows a top view of the horizontal articulation of the rollover structure and frame of the personal vehicle of the present invention.

Referring to FIG. 7, there is shown a top view of the roll over structure 28 and frames 34 and 38 of the personal vehicle 10. The rollover structure 28 has a first section 79 and a second section 83. The first section 79 in mounted to the frame 38 of the fore section 12a. The second section 83 is mounted to the frame 34 of the aft section 12b. The first section 79 has a rectangular portion 80 that is positioned above the seat 20 of the personal vehicle 10. The first section 79 has a female connection 82 located above the articulating point 30 on the longitudinal axis 74 of the articulating point 30. The second section 83 has a triangular portion 84. The triangular portion 84 is positioned above the motor 14 of the personal vehicle 10. The triangular portion 84 has a point 87. The point 87 has a male connection 86 that connects with the female connection 82 of the first section 79 so that the first section 79 horizontally articulates relative to the second section 83 along the longitudinal axis 74 of the articulating point 30.

Figure 8:
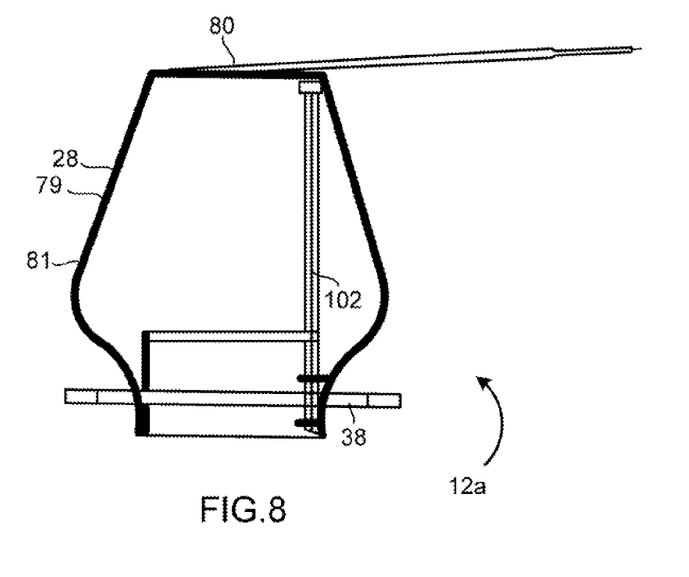
FIG. 8 shows a front elevational view of the rollover structure and frame of the personal vehicle of the present invention.

Referring to FIG. 8, there is shown a front elevational view of the first section 79 of the rollover structure 28 and frame 38 of the fore section 12a. The first section 79 of the rollover structure 28 has an hour-glass portion 81. The hour-glass portion 81 is positioned behind the seat 20. A transfer bar in an assist position 100 is attached to a top 101 of the frame 38 of the fore section 12a. The transfer bar 100 can extend from either side of the frame 38 so that a user of the vehicle 10 can use their arms to pull themselves into the vehicle 10. The transfer bar in the stowed position 102 is also shown. The transfer bar 102 is placed adjacent the frame 38 when in the stowed position and is easily accessible by a user of the vehicle 10 for subsequent use.

Figure 9:
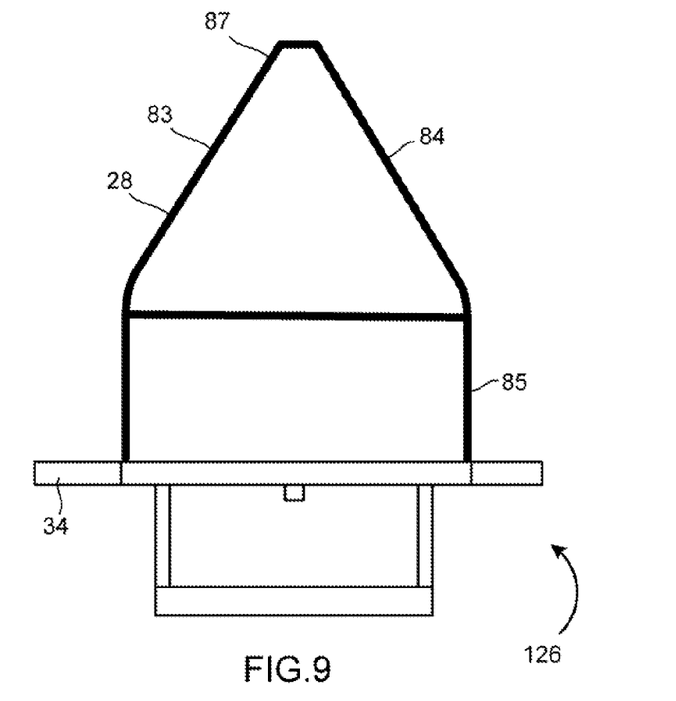
FIG. 9 shows a rear elevational view of the rollover structure and frame of the present invention.

Referring to FIG. 9, there is shown a rear elevational view of the second section 83 of the rollover structure 28 and frame 34 of the aft section 12b. The second section 83 of the rollover structure 28 has a rectangular portion 85 that is positioned behind the motor 14. The second section 83 of the rollover structure 28 is formed so as to protect the motor 14 and other components mounted to the aft section 12b. The rectangular section 85 extends upwardly from the frame 34 of the aft section 12b. The triangular section 84 angles upwardly from the rectangular section 85 to point 87, where the second section 83 mates with the first section 79.

The personal vehicle can be equipped with headlights, which are turned on by a switch on the interface 22a. A horn button can also be located on the interface 22a. Engine speed can be increased by holding down a button on the interface 22a until a desired speed is reached. Likewise, engine speed can be decreased by holding down another button until the desired speed is reached.

The seat 20 on the personal vehicle 10 is the same height as a traditional wheelchair. Armrests 54 can be rotated upwards to facilitate transfer of a disabled person from the seat 20 to a wheelchair or from a wheelchair to the seat 20. Fenders 13a and 13b are flat and also the same height as the seat 20. The seat 20 is mounted on slide rails so as to allow forward and backward adjustment. The personal vehicle 10 allows many different types of seats to be chosen according to the comfort and requirements of the operator of the personal vehicle 10.

Electrical relays are mounted under the seat 20 so as to protect the electrical components of the means and hydraulic system 75 from the weather. A wiring harness runs through a rectangular-tube frame of the tank 16 so as to protect the wiring harness from the elements.

The configuration and arrangement of the personal vehicle 10 provides users with new sensations and capabilities. The seat 20 gives the operator unobstructed views, closer connections, and interactions with the surroundings and other persons in those surroundings. The joystick 22 and interface 22a are ergonomically placed and provide the operator of the personal vehicle 10 with ease of maneuvering and controlling the vehicle 10. The null valve 32 is a safety feature because it brings the drive cylinder 42 back to a neutral position in the event that the user's hand leaves the joystick 22. In the neutral position, the null valve 32 brings the vehicle 10 to a stop or crawl.

Four-wheel drive enables the vehicle 10 to tackle obstructed terrain with surprising ease. Many tire designs can be used for the wheels 15*a* and 15*b* so as to accentuate the performance of the vehicle 10. The vehicle 10 can also be used in front-wheel drive or rear-wheel drive only modes.

Articulating the personal vehicle 10 allows maneuvering into much tighter turns in smaller spaces than a conventional ATV of the same dimensions. A surprising feature of the vehicle 10 is that the aft section 12*b* becomes virtually unnoticed from the front. While backing, the rear of the vehicle 10 comes into view thus making its direction easily noticeable. Articulating the vehicle 10 also allows more ground to be undisturbed as the rear wheels 15*b* follow in a nearly exact track of the front wheels 15*a*. Another feature is the crawling ability that amplifies traction as the vehicle 10 is turned in a zig-zag manner.

As stated above, the motor 14 can be a hybrid motor. That is, the motor 14 can have an internal combustion engine and batteries. The internal combustion engine provides the range and endurance needed for using the personal vehicle 10, while the electric motors provide low-noise operation during desired portions of an excursion. The internal combustion engine handles heavier loads and requires no time for recharging batteries.

Personal mobility allows a disabled person to choose the option and placement of equipment, power train, and controls. The personal vehicle 10 can be customized by elderly people for daily activities on a farm, ranch, camping trip, hunting, fishing, or just relaxing rides on nature trails or the beach. The personal vehicle 10 can also be used to pull trailers, power a log splitter, or hydraulically powered accessories by use of quick-connect hoses.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. A personal vehicle comprising:
    a fore section comprising:
        a frame;
        a transaxle mounted to said frame of said fore section; and
        a pair of wheels attached to said transaxle of said fore section;
    an aft section comprising:
        a frame horizontally articulated relative to said frame of said fore section;
        a transaxle vertically articulated relative to said frame of said aft section; and
        a pair of wheels attached to said transaxle of said aft section, each of said pair of wheels being vertically articulated relative to said frame of said aft section;
    a seat disposed on said frame of said fore section, said seat having an armrest;
    a means for interfacing a user to directional mobility controls, said means being mounted to said fore section;
    a motor mounted to said frame of said aft section;
    a hydraulic system operatively connected to said motor, said hydraulic system comprising:
        a hydraulic pump operatively connected to said motor;
        a hydraulic fluid tank supplying a hydraulic fluid to said hydraulic pump;
        a first rotovalve operatively connected to said hydraulic pump and to said means;
        a drive cylinder operatively connected to said first rotovalve, said drive cylinder having a lever activating a movement of said transaxles of said fore and aft sections;
        a second rotovalve operatively connected to said hydraulic pump and to said means;
        a steering cylinder operatively connected to said second rotovalve, said steering cylinder operatively connected to said frame of said fore section and said frame of said aft section; and
        a null valve operatively connected to said lever of said drive cylinder, said null valve activating said drive cylinder so as to bring said transaxles of said fore and aft sections to a stop;
    a shaft operatively connected to said motor, said shaft positioned in an articulating point between said frame of said aft section and said frame of said fore section, said motor cooperative with said shaft for rotating said shaft;
    a fender assembly mounted to said fore and aft sections;
    a transfer bar attached to a top of said fore section; and
    a rollover structure mounted to said fore and aft sections, said rollover structure comprising:
        a first section mounted to said frame of said fore section, said first section having a rectangular portion and an hour-glass portion, said rectangular portion positioned above said seat, said hour-glass portion being positioned behind said seat, said first section having a female connection; and
        a second section mounted to said frame of said aft section, said section having a triangular portion and a rectangular portion, said triangular portion being positioned above said motor, said rectangular portion of said second section being positioned behind said motor.

2. The personal vehicle of claim 1, said means comprising:
    a joystick positioned on said armrest of said seat in said fore section, said joystick operatively connected to said first and second rotovalves of said hydraulic system; and
    an interface means cooperative with said joystick, said interface means for transmitting a control signal from said joystick to said interface.

3. The personal vehicle of claim 2, said joystick having a neutral position, said neutral position of said joystick suitable for allowing said null valve to activate said drive cylinder so as to bring said transaxles of said fore and aft sections to a stop.

4. The personal vehicle of claim 2, said interface means being hydraulically controlled.

5. The personal vehicle of claim 2, said interface means having a touch-sensitive panel.

6. The personal vehicle of claim 2, said joystick being operatively connected to said first rotovalve by a first electromechanical box, said first electromechanical box suitable for converting an electronic signal from said joystick to a mechanical signal, said first electromechanical box having an arm operatively connected to said first rotovalve.

7. The personal vehicle of claim 2, said joystick being operatively connected to said second rotovalve by a second electromechanical box, said second electromechanical box suitable for converting an electronic signal from said joystick to a mechanical signal, said second electromechanical box having an arm operatively connected to said second rotovalve.

8. The personal vehicle of claim 2, said first rotovalve operatively connected to said drive cylinder so as to control said forward and backward movement, said second rotovalve operatively connected to said steering cylinder so as to control said left and right movement.

9. The personal vehicle of claim 8, said steering cylinder comprising:
   a first cylinder having a first fluid connection and a second fluid connection, said first fluid connection being connected to said second rotovalve; and
   a second cylinder having a first fluid connection and a second fluid connection, said first fluid connection of said second cylinder being connected to said second rotovalve and to said second fluid connection of said first cylinder, said second fluid connection of said second cylinder being connected to said first fluid connection of said first cylinder and to said second fluid connection of said first cylinder through an adjustable orifice.

10. The personal vehicle of claim 1, said first rotovalve being connected to said hydraulic fluid tank, said second rotovalve being connected to said hydraulic fluid tank, said null valve being connected to said hydraulic fluid tank.

11. The personal vehicle of claim 1, said shaft driving said transaxles of said fore and aft sections, said transaxle of said fore section rotating said pair of wheels of said fore section and said transaxle of said aft section rotating said pair of wheels of said aft section.

12. The personal vehicle of claim 1, said hydraulic pump suitable for pressurizing said hydraulic fluid, said hydraulic pump suitable for passing said hydraulic fluid to said first and second rotovalves, said hydraulic pump suitable for passing said hydraulic fluid to said null valve, said hydraulic system further comprising:
   an auxiliary connection operatively connected to said hydraulic fluid pump, said hydraulic fluid pump providing said hydraulic fluid to said auxiliary connection.

13. The personal vehicle of claim 1, each of said pair of wheels of said fore section having an independent suspension, each of said pair of wheels of said aft section having an independent suspension, each of said pair of wheels having a motor.

14. The personal vehicle of claim 1, said shaft operatively connected to said transaxle of said fore section by a belt, said shaft rotatably connected to said belt so as to create a movement of said pair of wheels of said fore section with said transaxle of said fore section.

15. The personal vehicle of claim 14, said shaft operatively connected to said transaxle of said aft section by another belt, said shaft rotatably connected to said other belt so as to create a movement of said pair of wheels of said aft section with said transaxle of said aft section.

16. The personal vehicle of claim 1, said fender assembly comprising:
   a first pair of fenders mounted on said frame of said fore section, said first pair of fenders being formed of a material selected from the group consisting of fiberglass, aluminum, and steel; and
   a second pair of fenders mounted on said frame of said aft section, said second pair of fenders being formed of a material selected from the group consisting of fiberglass, aluminum, and steel.

17. The personal vehicle of claim 1, said triangular portion having a point, said point having a male connection, said male connection connected to said female connection so that said first section horizontally articulates relative to said second section along a longitudinal axis of said articulating point.

18. The personal vehicle of claim 1, said motor being a gasoline engine, said gasoline engine having a generator supplying electricity to said means and to said hydraulic system.

* * * * *